United States Patent
Ochiai et al.

(10) Patent No.: US 9,664,498 B2
(45) Date of Patent: May 30, 2017

(54) VARIABLE RELUCTANCE RESOLVER

(71) Applicant: Minebea Co., Ltd., Kitasaku-gun, Nagano (JP)

(72) Inventors: Takaaki Ochiai, Yachimata (JP); Shuumei Shirayanagi, Hamamatsu (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 703 days.

(21) Appl. No.: 13/709,346

(22) Filed: Dec. 10, 2012

(65) Prior Publication Data

US 2013/0162243 A1    Jun. 27, 2013

(30) Foreign Application Priority Data

Dec. 22, 2011    (JP) ................. 2011-280698

(51) Int. Cl.
| | |
|---|---|
| *H02K 11/00* | (2016.01) |
| *G01B 7/30* | (2006.01) |
| *G01D 5/20* | (2006.01) |
| *H02K 5/22* | (2006.01) |

(52) U.S. Cl.
CPC ............ *G01B 7/30* (2013.01); *G01D 5/2046* (2013.01)

(58) Field of Classification Search
CPC .... H02K 5/225; H02K 7/116; H02K 11/0031; H02K 11/0073; H02K 5/22
USPC .... 310/68 B, 86, 89, 214, 215, 7.71, 71, 41, 310/43; 324/207.25, 207.16, 207.13
See application file for complete search history.

(56) References Cited

U.S. PATENT DOCUMENTS

| | | | | |
|---|---|---|---|---|
| 4,049,984 | A | * | 9/1977 | Ishii et al. ............... 310/112 |
| 4,259,603 | A | * | 3/1981 | Uchiyama et al. ...... 310/68 B |
| 7,348,699 | B2 | * | 3/2008 | Ritzinger et al. ........... 310/86 |
| 2008/0018193 | A1 | * | 1/2008 | Kobayashi ........ H02K 3/522 310/219 |

(Continued)

FOREIGN PATENT DOCUMENTS

| | | |
|---|---|---|
| JP | 2006-158014 A | 6/2006 |
| JP | A-2008-164534 | 7/2008 |

(Continued)

OTHER PUBLICATIONS

Jan. 13, 2016 Office Action issued in Japanese Patent Application No. 2011-280698.

(Continued)

*Primary Examiner* — Michael Andrews
(74) *Attorney, Agent, or Firm* — Oliff PLC

(57) ABSTRACT

A variable reluctance resolver has a stator combined with a housing. The resolver does not require extra space in a case for a device, into which the resolver is mounted, and it is easily coaxially mounted to the device. The resolver includes a ring-like stator 10, a rotor 20, and a housing 30. The stator 10 has a stator core 100, a first insulator 110, a second insulator 120, and coils 130. The stator core 100 is provided with plural salient poles 101. The first insulator 110 and the second insulator 120 hold the stator core 100 therebetween from both sides of the stator core 100. The coils 130 are wound to the salient poles 101 via the first insulator 110 and the second insulator 120. The housing 30 accommodates the stator 10. The first insulator 110 is coaxially integrally formed with the housing 30.

11 Claims, 8 Drawing Sheets

(56) References Cited

U.S. PATENT DOCUMENTS

| | | | | |
|---|---|---|---|---|
| 2008/0164784 A1* | 7/2008 | Huang | ............... | H02K 5/225 310/89 |
| 2008/0179975 A1* | 7/2008 | Kataoka | ............ | H02K 5/225 310/71 |
| 2010/0259118 A1* | 10/2010 | Kitagawa | ............ | H02K 5/225 310/54 |

FOREIGN PATENT DOCUMENTS

| | | | |
|---|---|---|---|
| JP | 2008-187787 A | 8/2008 |
| JP | 2009-180179 A | 8/2009 |
| JP | 2010-127834 A | 6/2010 |
| JP | 2010-161874 A | 7/2010 |

OTHER PUBLICATIONS

Aug. 26, 2015 Office Action issued in Japanese Application No. 2011-280698.

\* cited by examiner

VARIABLE RELUCTANCE RESOLVER

BACKGROUND OF THE INVENTION

Field of the Invention

The present invention relates to a VR resolver (Variable Reluctance resolver) that may be used for measuring a rotation angle of a motor.

Description of Related Art

In general, VR resolvers are formed primarily of a ring-like stator and a rotor that is arranged inside the stator. The stator has a ring-like stator core, a first insulator and a second insulator that have electric insulating characteristics, and coils. The stator core is formed by laminating plural circular yoke sheet members that are obtained by press cutting soft magnetic materials. The stator core is held between the first insulator and the second insulator from both end surfaces of the stator core. The stator core is formed with plural salient poles at an inner circumferential surface thereof, and the coils are wound to the salient poles via the first insulator and the second insulator.

Such a resolver may be inserted and mounted in a tubular case together with a device to be measured, such as a motor or the like. In this case, the resolver must be fixed in the case, and therefore, the resolver must be provided with a screw hole or the like at the outer circumferential surface thereof for fixing. In this fixing method, space is necessary at the outer circumference of the main body of the resolver for the fixing. However, there may be cases in which the space cannot be provided when the resolver is mounted in a limited space such as in an automobile. In this regard, a structure, in which a main body of a resolver and a housing for fixing are integrally formed, is disclosed in, for example, Japanese Unexamined Patent Application Laid-open No. 2008-164534.

According to the invention disclosed in Japanese Unexamined Patent Application Laid-open No. 2008-164534, a housing, an insulator for electric insulating, and a terminal base portion are integrally formed by using a stator core and a terminal block as cores for insert molding, and then wires are wound. Thus, the main body of the resolver and the housing are integrally formed. When a resolver and a device to be measured are inserted and mounted in a tubular case, the outer shape of the housing must correspond with the outer shape of the case. In the invention disclosed in Japanese Unexamined Patent Application Laid-open No. 2008-164534, the mold is complicated so as to insert mold the stator core and the terminal block. Therefore, the housing function cannot be provided in the vicinity of the terminal base portion that is a connection to the outside. Moreover, cooling rate of resin varies due to the insert molding of the metals of the stator core and the terminal block, whereby dimensional accuracy is degraded, which may cause difficulties in matching the axes of the resolver and a device in assembly.

SUMMARY OF THE INVENTION

The present invention has been completed in view of these circumstances, and it is an object of the present invention to provide a VR resolver having a main body that is combined with a housing. The VR resolver does not require extra space in a case for a device, into which the resolver is mounted, and it is easily coaxially mounted to the device.

According to a first aspect of the present invention, the present invention provides a VR resolver including a ring-like stator, a rotor, and a housing. The stator includes a stator core, a first insulator, a second insulator, and coils. The stator core is provided with plural salient poles. The first insulator and the second insulator hold the stator core therebetween from both sides of the stator core. The coils are wound to the salient poles of the stator core via the first insulator and the second insulator. The rotor is arranged inside the stator. The housing accommodates the stator and is used for inserting the stator into a tubular case. The first insulator is coaxially integrally formed at the housing.

According to the first aspect of the present invention, the stator core and the second insulator are fitted to the first insulator that is integrally formed with the housing, and the coils are wound to the salient poles of the stator core, which are electrically insulated by the first insulator and the second insulator. Therefore, a VR resolver having a stator that is combined with a housing is obtained. Accordingly, when the resolver and a device to be measured are being mounted in a tubular case, they are easily coaxially assembled to the case only by inserting the housing into the case.

According to a second aspect of the present invention, in the invention according to the first aspect of the present invention, the first insulator and the second insulator may have surfaces that face each other. In addition, one of the surfaces of the first insulator and the second insulator may be formed with a boss portion, and the other surface may be formed with a connecting hole for fitting with the boss portion. In this case, the first insulator and the second insulator may be connected by fitting the boss portion into the connecting hole.

According to a third aspect of the present invention, in the invention according to the first aspect of the present invention, the housing may be formed with a positioning means for setting an angular position of the VR resolver with respect to a device to be measured.

According to a fourth aspect of the present invention, in the invention according to the first aspect of the present invention, the second insulator may be mounted with a temperature sensing means.

According to the present invention, a VR resolver having a main body that is combined with a housing is provided. The VR resolver does not require extra space in a case for a device, into which the resolver is mounted, and it is easily coaxially mounted to the device.

PREFERRED EMBODIMENTS OF THE INVENTION

Structure

An embodiment of the present invention will be described with reference to the figures hereinafter.

Figure 1:
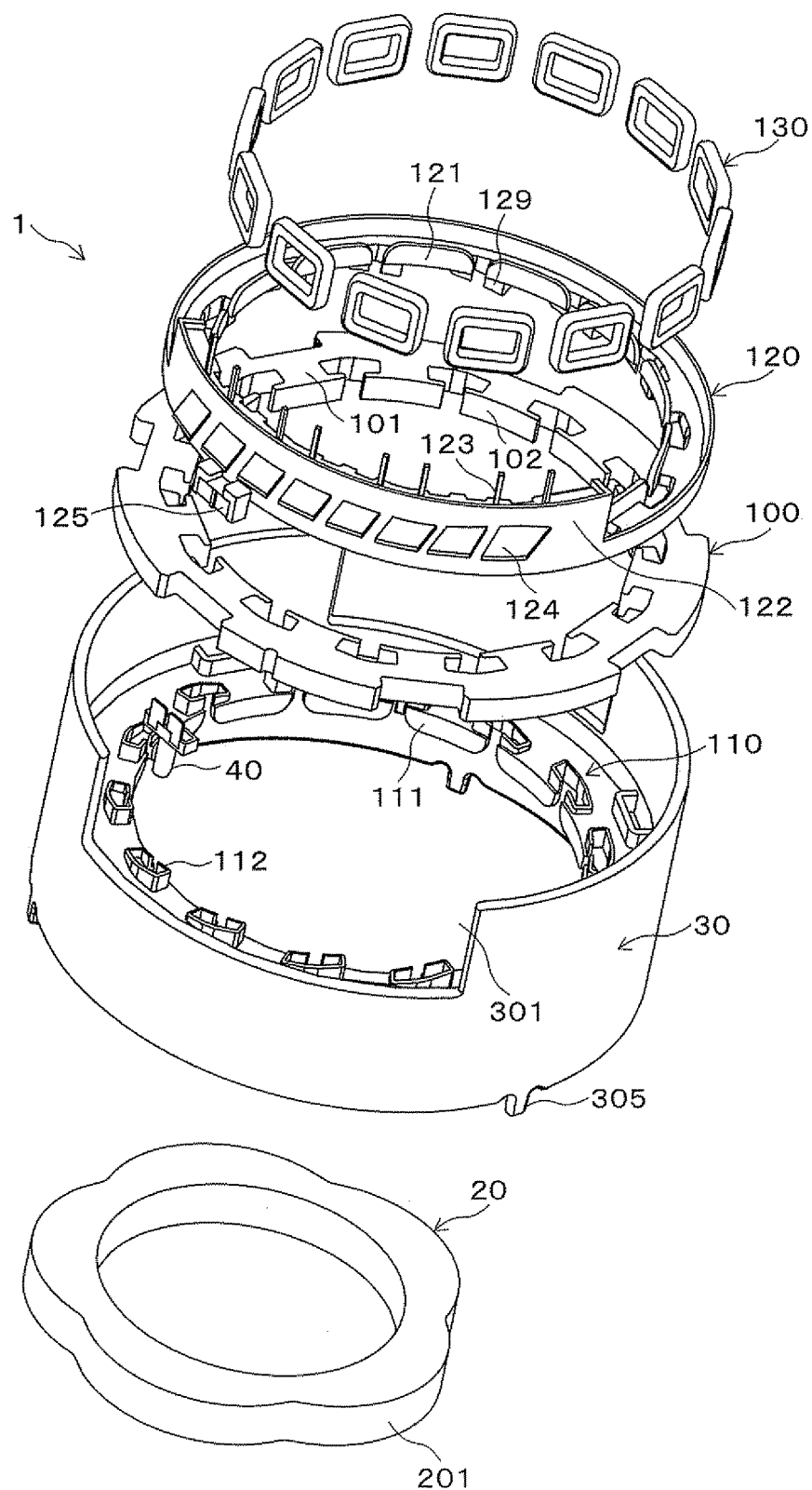
FIG. 1 is an exploded perspective view of a VR resolver relating to an embodiment of the present invention.
Figure 2:
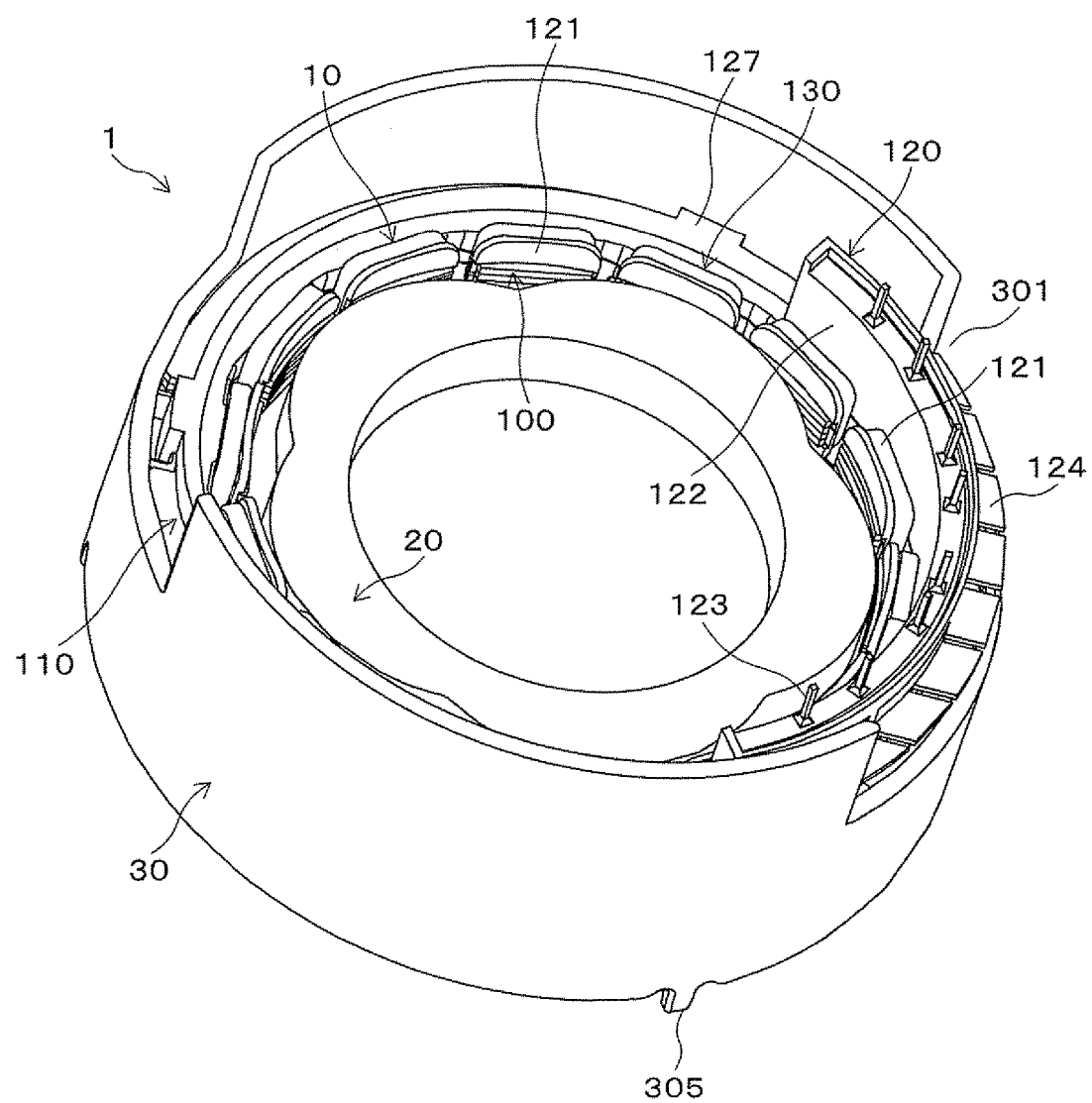
FIG. 2 is a perspective view of the resolver shown in FIG. 1 in a combined condition.
Figure 3:
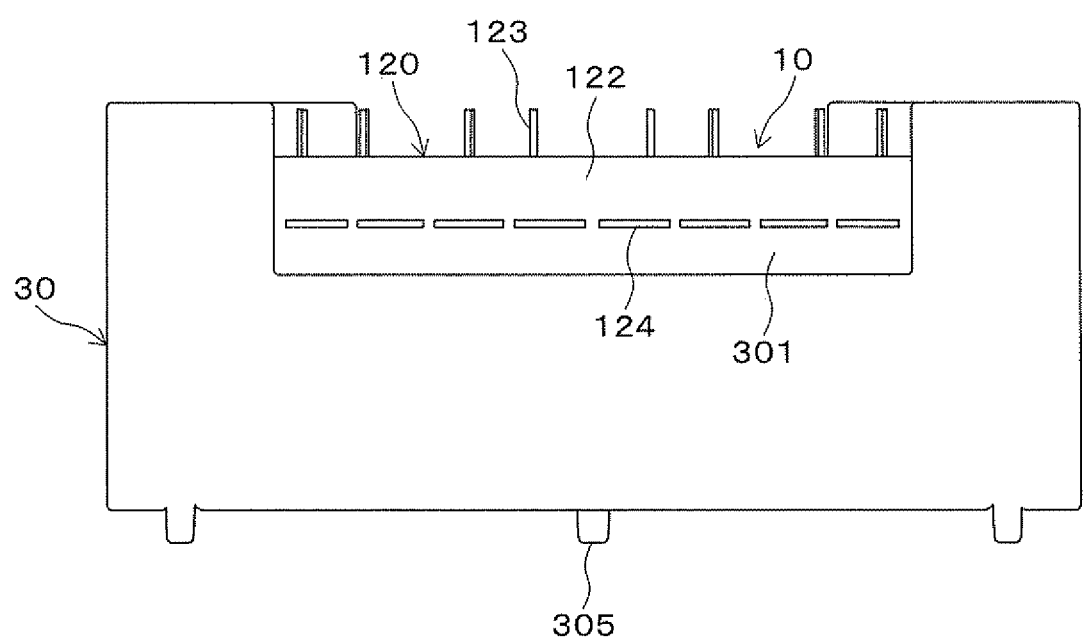
FIG. 3 is a side view of the resolver shown in FIG. 1.

FIG. 1 is an exploded perspective view of a VR resolver (hereinafter called a "resolver") 1 relating to an embodiment of the present invention. FIGS. 2 and 3 are a perspective view and a side view of the resolver 1 in a combined condition, respectively. The resolver 1 of an embodiment is formed of a ring-like stator 10, a ring-like rotor 20 that is arranged inside the stator 10, and a cylindrical housing 30 that accommodates the stator 10. The stator 10 has a stator core 100, two insulators, that is, a first insulator 110 and a second insulator 120, and coils 130. The first insulator 110 and the second insulator 120 are combined so as to hold the stator core 100 therebetween from both sides of the stator core 100 in an axial direction. The stator core 100 is formed with plural salient poles 101, and the coils 130 are wound to the salient poles 101 of the stator core 100 that is insulated by the first insulator 110 and the second insulator 120.

Structural Feature of Each Member

Stator Core and Rotor

The stator core 100 is a primary portion of the stator 10 and is formed by laminating plural sheets in the axial direction. This sheet is made of a soft magnetic material (for example, a silicon steel sheet) and is formed into a ring shape by press cutting. The stator core 100 is formed with plural salient poles 101 at equal spaces of an inner circumferential portion thereof in the circumferential direction, and the salient poles 101 inwardly extend in a radial direction and function as magnetic poles. Each of the salient poles 101 has a top end portion that is curved in the circumferential direction, and the top end portion has a top end surface that is formed with a salient pole surface 102 which faces an outer circumferential surface of the rotor 20. The rotor 20 is formed by laminating plural sheets in the axial direction. This sheet is made of a soft magnetic material (for example, a silicon steel sheet) and is formed into a ring shape by press cutting. The rotor 20 has an inner circumferential surface that is formed into a simple true circular shape and is made so as to be fixed to a rotation axis of a device to be measured. The rotor 20 has an outer circumferential surface that is formed with plural arc-like convex portions 201 at equal spaces in the circumferential direction and that has a concavo-convex shape.

Housing

The housing 30 is made of an insulating material such as resin and is formed into a cylindrical shape. The housing 30 is formed with plural cutouts 301 at one end side (in this case, the upper side) in the circumferential direction, and the cutouts 301 have a predetermined length. The cutouts 301 are formed at two portions in the example of this embodiment shown in the figures, but the cutouts 301 are not limited to the two portions and may be formed at one portion or three or more portions. The cutout is used for exposing external terminals 124, which will be described later.

First Insulator

The housing 30 has an inner circumferential surface that is integrally formed with a ring-like first insulator 110. The first insulator 110 has an inner circumferential edge that is formed coaxially with the housing 30 and that is formed with walls 112 and plural flange portions 111 at equal spaces in the circumferential direction. The walls 112 insulate side surfaces of the salient poles 101 of the stator core 100, and the flange portions 111 protrude toward the lower side of the housing 30. The positions and the number of the walls 112 that insulate the side surfaces of the salient poles 101, and the positions and the number of the flange portions 111, are set according to the salient poles 101 of the stator core 100.

Second Insulator

The second insulator 120 is a counterpart of the first insulator 110, and it is made of an insulating material such as resin and is formed into a ring shape as in the case of the housing 30. The second insulator 120 can be accommodated in the housing 30 and has an outer diameter that is smaller than the inner diameter of the housing 30.

The second insulator 120 has an inner circumferential edge that is formed with walls 129 and plural flange portions 121 at equal spaces in the circumferential direction. The walls 129 insulate side surfaces of the salient poles 101 of the stator core 100, and the flange portions 121 protrude toward the upper side in FIG. 1. In the second insulator 120, the positions and the number of the walls 129 that insulate the side surfaces of the salient poles 101, and the positions and the number of the flange portions 121, are also set according to the salient poles 101 of the stator core 100.

In addition, the second insulator 120 is formed with a terminal base portion 122 at a part of an outer circumferential edge thereof. The terminal base portion 122 protrudes toward the upper side in FIG. 1 and has a length corresponding to the number of the external terminals 124, which will be described later.

The terminal base portion 122 has an inner portion to which plural terminal pins 123 are vertically arranged at predetermined spaces along the circumferential direction. Moreover, the terminal base portion 122 has an outer circumferential portion to which plural external terminals 124 are insert molded along the circumferential direction. The external terminals 124 conduct electricity according to each terminal pin 123. The terminal pin 123 and the external terminal 124 are formed of one part.

The length of the terminal base portion 122 is set so that the portion arranged with the external terminals 124 can be fitted to the cutout 301 of the housing 30.

Production

The stator 10 is combined by fitting the salient poles 101 of the stator core 100 to the insulating walls 112 of the first insulator 110 inside the housing 30. Then, the second insulator 120 is combined with the stator core 100 from above by fitting the insulating walls 129 to the salient poles 101. In this case, the terminal base portion 122 of the second insulator 120 is arranged so as to correspond to the cutout 301 of the housing 30. Thus, the salient poles 101 of the stator core 100 are held between the first insulator 110 and the second insulator 120 from the upper side and the bottom side. Therefore, the salient poles 101 of the stator core 100 are covered with the insulating walls 112 of the first insulator 110 and the insulating walls 129 of the second insulator 120. Then, by winding coils 130 to the salient poles 101 of the stator core 100, the stator 10 is formed. The lead wires of the wound coils 130 are connected to the terminal pins 123 of the terminal base portion 122 with both ends thereof.

Figure 4:
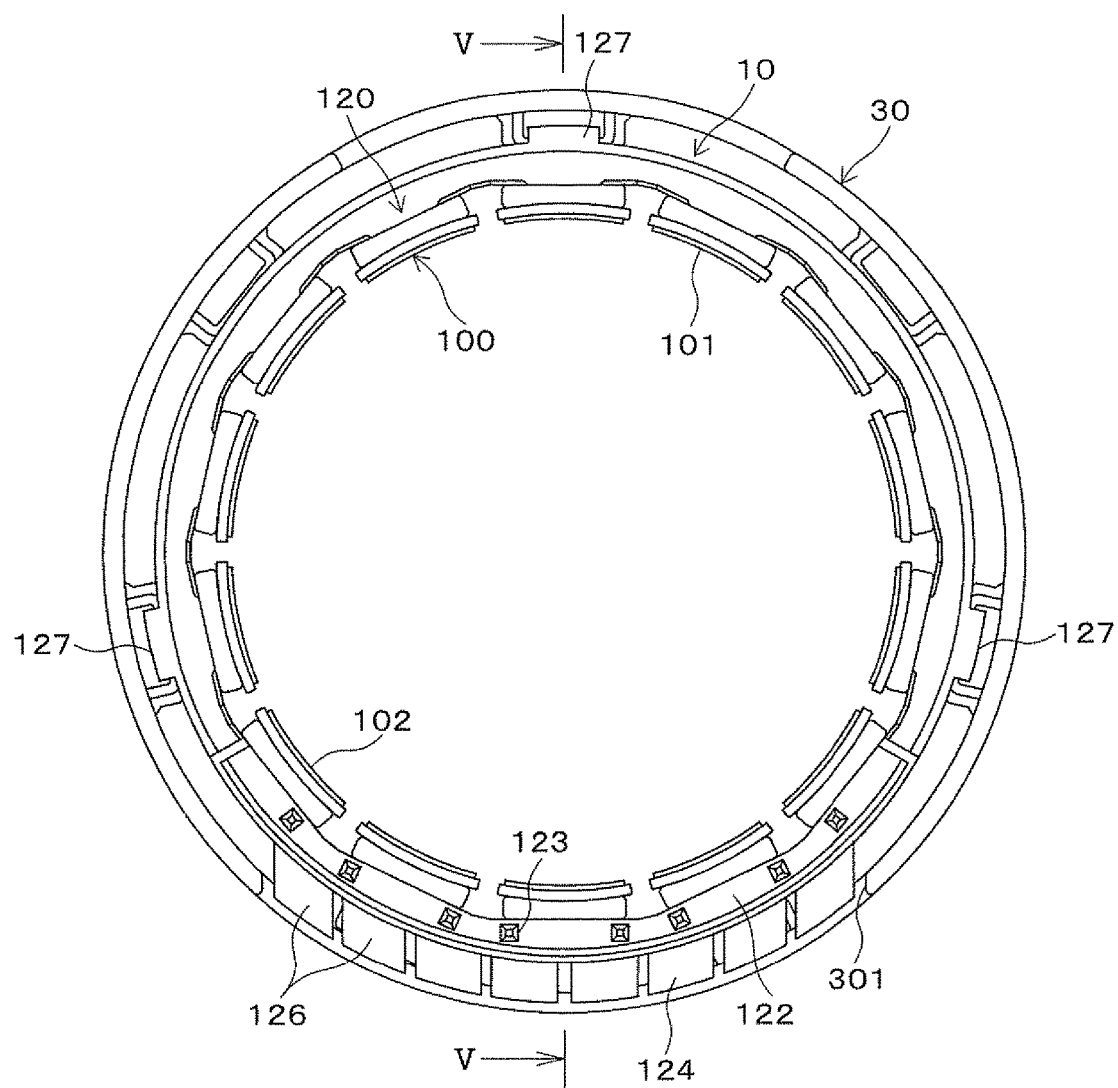
FIG. 4 is a top view of the resolver without a rotor, which is shown in FIG. 1.
Figure 5:
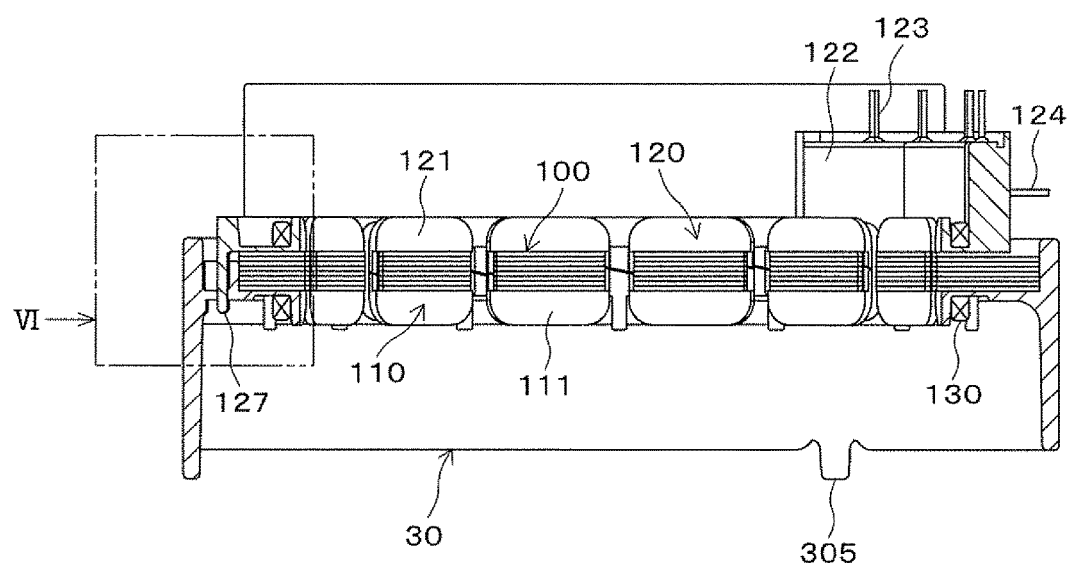
FIG. 5 is a cross section that is viewed from arrows at a line V-V in FIG. 4.
Figure 6:
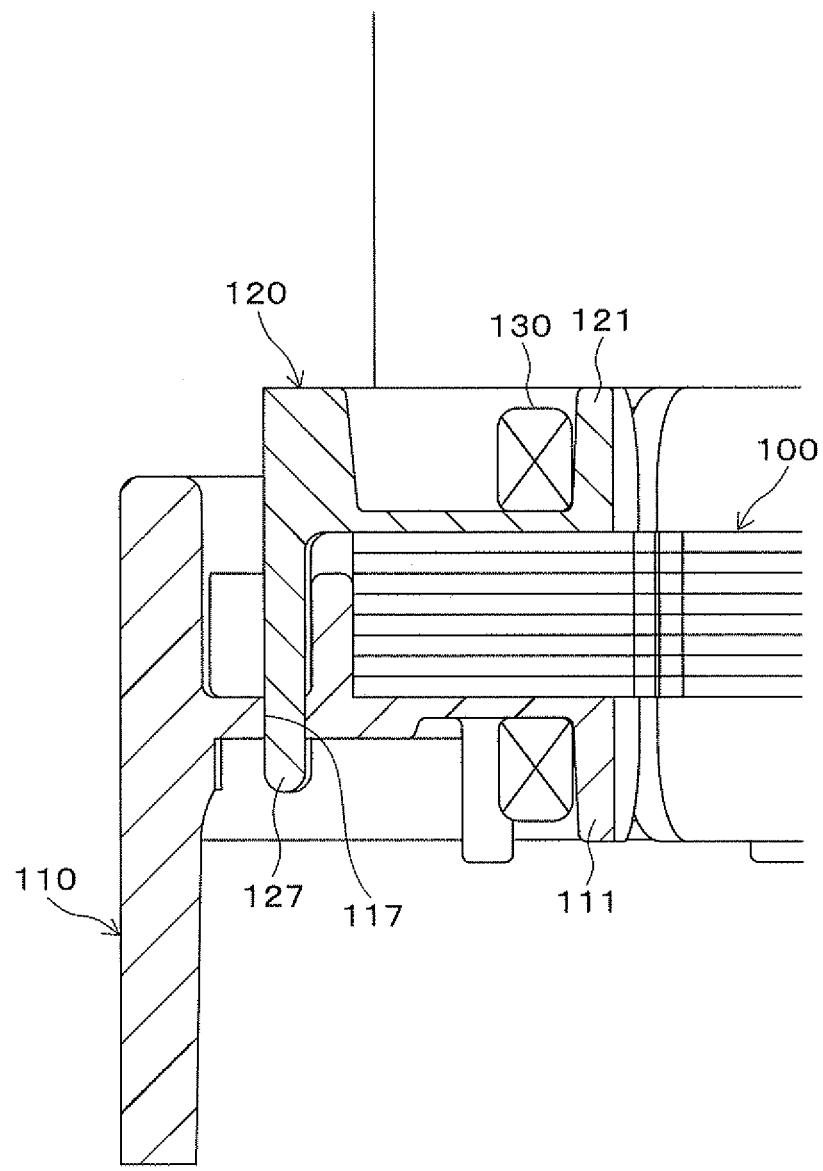
FIG. 6 is an enlarged view of a portion indicated by symbol VI in FIG. 5.

FIG. 4 is a top view of the resolver 1 without the rotor 20. FIG. 5 is a cross section that is viewed from arrows at a line V-V in FIG. 4. FIG. 6 is an enlarged view of a portion indicated by symbol VI in FIG. 5.

As shown in FIGS. 4 and 6, the surface of the second insulator 120, which faces the first insulator 110, is formed with plural (in this case, three) boss portions 127 that protrude to the first insulator 110 side, that is, to the lower side in FIG. 6.

On the other hand, as shown in FIG. 6, the first insulator 110 is formed with plural connecting holes 117 at positions to which the protruding boss portions 127 of the second insulator 120 are fitted.

When the stator 10 is combined, the boss portions 127 of the second insulator 120 are fitted into the connecting holes 117 of the first insulator 110, and then the first insulator 110 and the second insulator 120 are connected by a bonding means such as adhesive bonding, welding, or the like. The boss portions and the connecting holes are not limited to the positions in this embodiment, but the boss portions may be formed to the first insulator 110 whereas the connecting holes may be arranged to the second insulator 120.

Method of Measuring Angle

The coils 130 include three kinds of coils, that is, an exciting coil, a sine phase detection coil, and a cosine phase detection coil, which are publicly known as common materials used in a resolver. The lead line of each coil is connected to a predetermined terminal pin 123 with an end thereof. Supply of exciting current from the outside, outputs of sine phase signal and cosine phase signal to the outside, are performed via the external terminals 124 that are integrally formed with the terminal pins 123.

While electric current is supplied to the exciting coil, when the rotor 20 is rotated in synchronization with a motor 50, currents are induced by the sine phase detection coil and the cosine phase detection coil. The induced currents vary because the distance between the convex portion 201 of the rotor 20 and the salient pole surface 102 of the salient pole 101 of the stator core 100 is periodically changed. The induced currents induced by the sine phase detection coil and the cosine phase detection coil are measured, and the change of the induced currents are calculated by a predetermined calculating means such as an RD converter (Resolver-digital converter), whereby rotation angle of the rotor 20 is measured.

Assemblage

Figure 7:
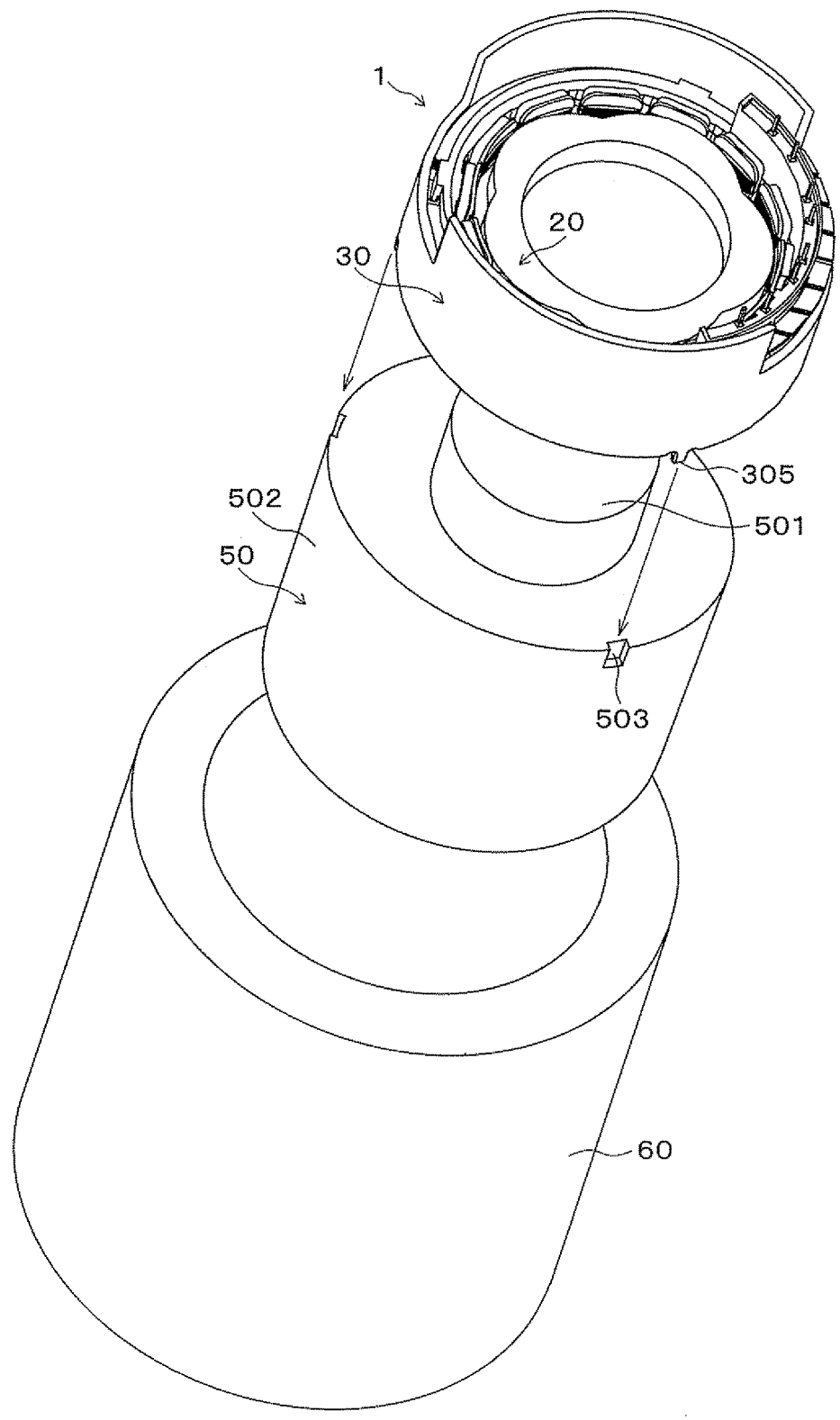
FIG. 7 is a perspective view that shows a condition in which a resolver of an embodiment is being mounted to a motor that is to be inserted into a case.

In the resolver 1, after the stator 10 is accommodated in the housing 30 as described above, the rotor 20 is fixed to a driving shaft 501 of the motor 50 as shown in FIG. 7. Then, the inside of the stator 10 is concentrically arranged outside the rotor 20. The motor 50 is a device to be measured, and rotation angle of the driving shaft 501 of the motor 50 is measured by the resolver 1.

The housing 30 is formed with plural (in this case, three) positioning pins (positioning means) 305 at equal spaces of a lower end edge thereof in the circumferential direction. The positioning pins 305 protrude downwardly. By fitting the positioning pins 305 into receiving recesses 503 that are formed at an outer circumferential edge of an end surface of a cylindrical body 502 of the motor 50, the angular position of the resolver 1 is set with respect to the motor 50.

Thermistor

Figure 8:
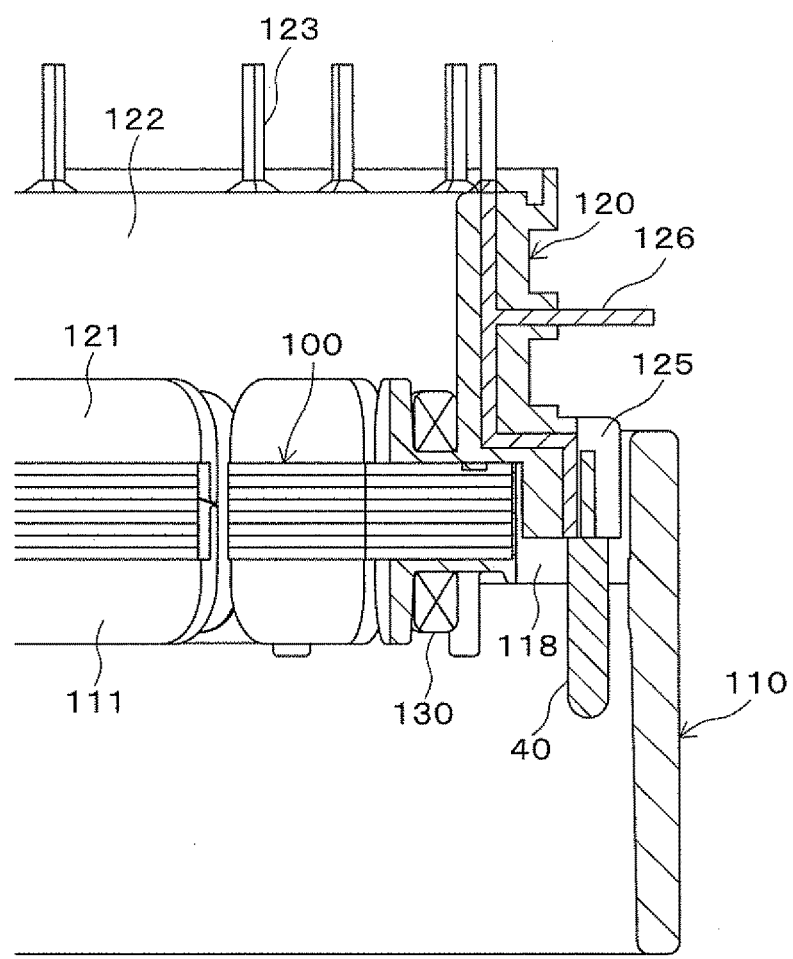
FIG. 8 is a cross section of a part of a stator for describing a thermistor.

The resolver 1 in this embodiment is also provided with a temperature sensing means in addition to the angle measuring means. Specifically, the second insulator 120 is integrally formed with a thermistor holder 125 at a part of the outer circumferential surface of the terminal base portion 122 under the external terminals 124. The thermistor holder 125 protrudes toward the first insulator 110. As shown in FIG. 8, a thermistor terminal 126 is provided inside the thermistor holder 125 of the second insulator 120 by insert molding, and a thermistor (temperature sensing means) 40 is upwardly inserted into the thermistor holder 125 and is thereby connected to the thermistor terminal 126.

Moreover, as shown in FIG. 8, the first insulator 110 is formed with an insert hole 118 which corresponds to the thermistor holder 125. The thermistor holder 125 and the thermistor 40 are inserted into the insert hole 118.

The thermistor 40 that is inserted and mounted to the thermistor holder 125 protrudes through the insert hole 118 toward the motor 50, whereby the temperature of the motor 50 is sensed by the thermistor 40. The thermistor terminal 126 of the thermistor 40 is connected with a temperature measuring device, and surrounding temperature of the motor 50 and the temperature of the coils are detected by measuring with the temperature measuring device.

Advantages

According to the resolver 1 in this embodiment, the stator core 100 and the second insulator 120 are fitted to the first insulator 110 that is integrally formed with the housing 30, whereby the salient poles 101 of the stator core 100 are insulated by the first insulator 110 and the second insulator 120. Then, by winding the coils 130 to the salient poles 101, a resolver in which the stator 10 is coaxially combined with the housing 30 is formed. Accordingly, in a case of, for example, inserting and mounting the motor 50 into a cylindrical case 60 as shown in FIG. 7, the resolver is easily coaxially mounted to the motor 50 without requiring an extra space in the case 60.

Since the insulator is formed of two parts, and the external terminals 124 are fixed to the second insulator 120, the shape of the first insulator 110 is simple, and the housing 30 is formed at the entirety of the outer circumference of the first insulator 110. Moreover, since the housing 30 and the first insulator 110 are not formed by inserting metal parts such as the stator core 100 in a molding, the dimensional relationship between the housing 30 and the stator 10 is improved and is superior.

When the second insulator 120 is connected to the first insulator 110, they are connected by fitting the boss portions 127 of the second insulator 120 into the connecting holes 117 of the first insulator 110. Therefore, the first insulator 110 and the second insulator 120 are strongly connected with each other. As a result, the resolver 1 has vibration resistance, and the wiring condition of the coils 130 is stable, whereby failure such as disconnection of a wire does not easily occur.

In the case of mounting the resolver 1 to the motor 50, the angular position of the resolver 1 is easily set with respect to the motor 50 by inserting the positioning pins 305 into the receiving recesses 503 of the motor 50.

Moreover, by arranging the thermistor 40 of a temperature sensing means inside the housing 30, the temperature of the motor 50 can be completely measured without exposing the motor 50 to the outside atmosphere.

Variations

The shape of the housing 30 in this embodiment may not be a cylindrical shape, depending on the shape of a case to be mounted with the main body of the resolver and a device to be measured. If the case does not have a cylindrical shape, the outer shape of the housing is formed so as to fit the shape of the case as long as the case has a tubular shape (for example, an angular tube shape).

The numbers and the positions of the boss portions 127 and the connecting holes 117 for connecting the first insulator 110 and the second insulator 120 are not limited to those in this embodiment. Also, the number and the positions of the positioning pins 305 of the housing 30, and the number and the positions of the receiving recesses 503, are not limited to those in this embodiment.

In order to arrange the housing 30 by limiting the circumferential position of the housing 30 with respect to the motor 50, the positioning pin 305 may be formed at one portion. Otherwise, the positioning pins 305 may be formed so as to have different dimensions, or the pairs of the positioning pins 305 and the receiving recesses 503 are arranged at unequal spaces.

Other Examples

The embodiment of the present invention is not limited to each of the above embodiments and includes various modifications that may be anticipated by a person skilled in the art. In addition, the effects of the present invention are also not limited to the description above. That is, various additions, changes, and partial deletions can be made in a range that does not exceed the general concept and object of the present invention, which are derived from the descriptions recited in the Claims and equivalents thereof.

What is claimed is:

1. A variable reluctance resolver comprising:
a tubular housing of which an outer surface is cylindrical over an entire circumference;
a stator accommodated inside the housing, the stator including a stator core, a first insulator, a second insulator, and coils, the stator core being provided with plural salient poles, the first insulator and the second insulator holding the stator core therebetween from both sides of the stator core, the coils being wound to the salient poles of the stator core via the first insulator and the second insulator, and the stator core being disposed inside the housing; and
a rotor being arranged inside the stator;
wherein the first insulator is coaxially integrally formed at the housing, and
wherein the first insulator is homogenously injected with the housing on an inner surface of the housing.

2. The variable reluctance resolver according to claim 1, wherein the first insulator and the second insulator have a surface that face each other, one of the surfaces of the first insulator and the second insulator is formed with an axially projecting boss portion, and the other surface is formed with a connecting hole for fitting with the boss portion, and the first insulator and the second insulator are connected by fitting the boss portion into the connecting hole.

3. The variable reluctance resolver according to claim 1, wherein the housing is formed with a positioning means for setting an angular position of the variable reluctance resolver with respect to a device to be measured.

4. The variable reluctance resolver according to claim 1, wherein the second insulator is mounted with a temperature sensing means.

5. The variable reluctance resolver according to claim 1, wherein the housing has a cylindrical shape.

6. The variable reluctance resolver according to claim 1, wherein the tubular housing and the first insulator are made of a resin.

7. The variable reluctance resolver according to claim 1, wherein the first insulator is coaxially integrally formed at an axially intermediate position of the housing.

8. The variable reluctance resolver according to claim 1, wherein the first insulator fits within the housing in an axial direction.

9. A variable reluctance resolver comprising:
a tubular housing;
a stator accommodated inside the housing, the stator including a stator core, a first insulator, a second insulator, and coils, the stator core being provided with plural salient poles, the first insulator and the second insulator holding the stator core therebetween from both sides of the stator core, and the coils being wound to the salient poles of the stator core via the first insulator and the second insulator; and
a rotor being arranged inside the stator;
wherein the first insulator is coaxially integrally formed at the housing,
wherein the first insulator is homogenously injected with the housing on an inner surface of the housing, and
wherein a terminal base portion is provided to the second insulator, plural terminal pins that project in an axial direction are arranged on the terminal base portion along a circumferential direction of the second insulator, plural external terminals that conduct electricity to the terminal pins and project in a radial and outward direction are arranged on the terminal base portion along a circumferential direction of the second insulator, a cutout which extends along the circumferential direction is formed in the housing, and the external terminals face the cutout.

10. The variable reluctance resolver according to claim 9, wherein the external terminals are plate-shaped.

11. The variable reluctance resolver according to claim 9, wherein the external terminals are disposed inside an circumferential surface of the housing.

* * * * *